(12) United States Patent
Fan et al.

(10) Patent No.: US 11,109,342 B2
(45) Date of Patent: Aug. 31, 2021

(54) METHOD AND ELECTRONIC DEVICE FOR OBTAINING LOCATION INFORMATION

(71) Applicant: ZHEJIANG UNIVERSITY, Zhejiang (CN)

(72) Inventors: Chengfei Fan, Zhejiang (CN); Liyan Li, Zhejiang (CN); Yunlong Cai, Zhejiang (CN); Minjian Zhao, Zhejiang (CN); Xinglong Xu, Zhejiang (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/157,336

(22) Filed: Jan. 25, 2021

(65) Prior Publication Data

US 2021/0153161 A1  May 20, 2021

Related U.S. Application Data

(63) Continuation of application No. PCT/CN2020/085728, filed on Apr. 20, 2020.

(30) Foreign Application Priority Data

Apr. 28, 2019 (CN) .......................... 201910349661.8

(51) Int. Cl.
*H04W 64/00* (2009.01)
*H04W 4/02* (2018.01)
(Continued)

(52) U.S. Cl.
CPC .......... *H04W 64/006* (2013.01); *G01S 19/46* (2013.01); *H04W 4/025* (2013.01); *H04W 4/029* (2018.02); *H04W 84/18* (2013.01)

(58) Field of Classification Search
CPC ...... H04W 64/006; H04W 4/029; G01S 19/46
See application file for complete search history.

(56) References Cited

U.S. PATENT DOCUMENTS

| 8,948,995 | B2* | 2/2015 | Pandita | B60W 30/17 |
| | | | | 701/96 |
| 2014/0045518 | A1* | 2/2014 | Sathyan | H04W 4/023 |
| | | | | 455/456.1 |
| 2020/0166601 | A1* | 5/2020 | Chen | G01S 5/0215 |

OTHER PUBLICATIONS

WIPO, ISR for PCT/CN2020/085728, Jun. 30, 2020.

* cited by examiner

*Primary Examiner* — Muthuswamy G Manoharan
(74) *Attorney, Agent, or Firm* — Hodgson Russ LLP

(57) ABSTRACT

The present disclosure provides a method and an electronic device for obtaining location information. Available measurement of a target node and multi-hop nodes in multiple consecutive time slices is obtained. A prediction is performed on the unavailable measurement due to the transmission delay to obtain prediction information. Location information of these nodes in the multiple time slices is obtained based on state variables of the target node and multi-hop nodes in the current time slice and mobility constraints, for reconstructing the trajectory information of these nodes. State information of these nodes in the current time slice is initially estimated based on available measurement to obtain initial state estimation in the current time slice. State estimation of these nodes in the current time slice is obtained by jointly processing the available measurement and the prediction information based on the trajectory constraints and the initial state estimation.

15 Claims, 4 Drawing Sheets

(51) Int. Cl.
*H04W 84/18* (2009.01)
*G01S 19/46* (2010.01)
*H04W 4/029* (2018.01)

METHOD AND ELECTRONIC DEVICE FOR OBTAINING LOCATION INFORMATION

CROSS REFERENCE TO RELATED APPLICATIONS

This application is a continuation application of an International Patent Application No. PCT/CN2020/085728, filed on Apr. 20, 2020, which is based on and claims priority to Chinese Patent Application No. 201910349661.8, filed on Apr. 28, 2019, the entire disclosures of which are incorporated by reference herein.

FIELD

The present disclose belongs to a field of navigation, and more particularly, to a distributed cooperative localization system based on joint processing of space-time domains and a same method.

BACKGROUND

Real-time and high-precision location information is useful for many wireless networks. There are a lot of methods to obtain the location information.

SUMMARY

The present disclosure provides a computer-implemented method for obtaining location information. The method includes:

obtaining, by a processor, available measurement of a target node and multi-hop nodes in multiple consecutive time slices up to a current time slice, the measurement comprising measured location information of the target node and the multi-hop nodes and measured relative distance between the target node and the multi-hop nodes;

predicting, by the processor, unavailable measurement in the considered multiple time slices caused by multi-hop transmission delay to obtain prediction information of the location information and the relative distance information;

obtaining location information of the target node and multi-hop nodes in the multiple consecutive time slices based on state variables of the target node and the multi-hop nodes in the current time slice to obtain trajectory information, in which the state variables at least include the location, velocity and acceleration;

initially estimating state information of the target node and multi-hop nodes in the current time slice based on available measurement to obtain initial state estimation in the current time slice; and obtaining state estimation of the target node and multi-hop nodes in the current time slice by jointly processing the available measurement and the prediction information of the location information and the relative distance information, based on the trajectory constraints and the initial state estimation, the state estimation including the location estimation of the target node in the current time slice.

The present disclosure further provides an electronic device for obtaining location information. The electronic device includes a processor and a memory. When instructions stored in the memory are executed by the processor, the processor is caused to perform the method for obtaining location information as described above.

The present disclosure further provides a non-transitory computer readable storage medium having instructions stored thereon. When the instructions are executed by a processor, the method for obtaining location information as described above is performed.

It should be understood, the above general description and the following detailed description are only exemplary and explanatory, and do not limit the disclosure.

DETAILED DESCRIPTION

Figure 1:
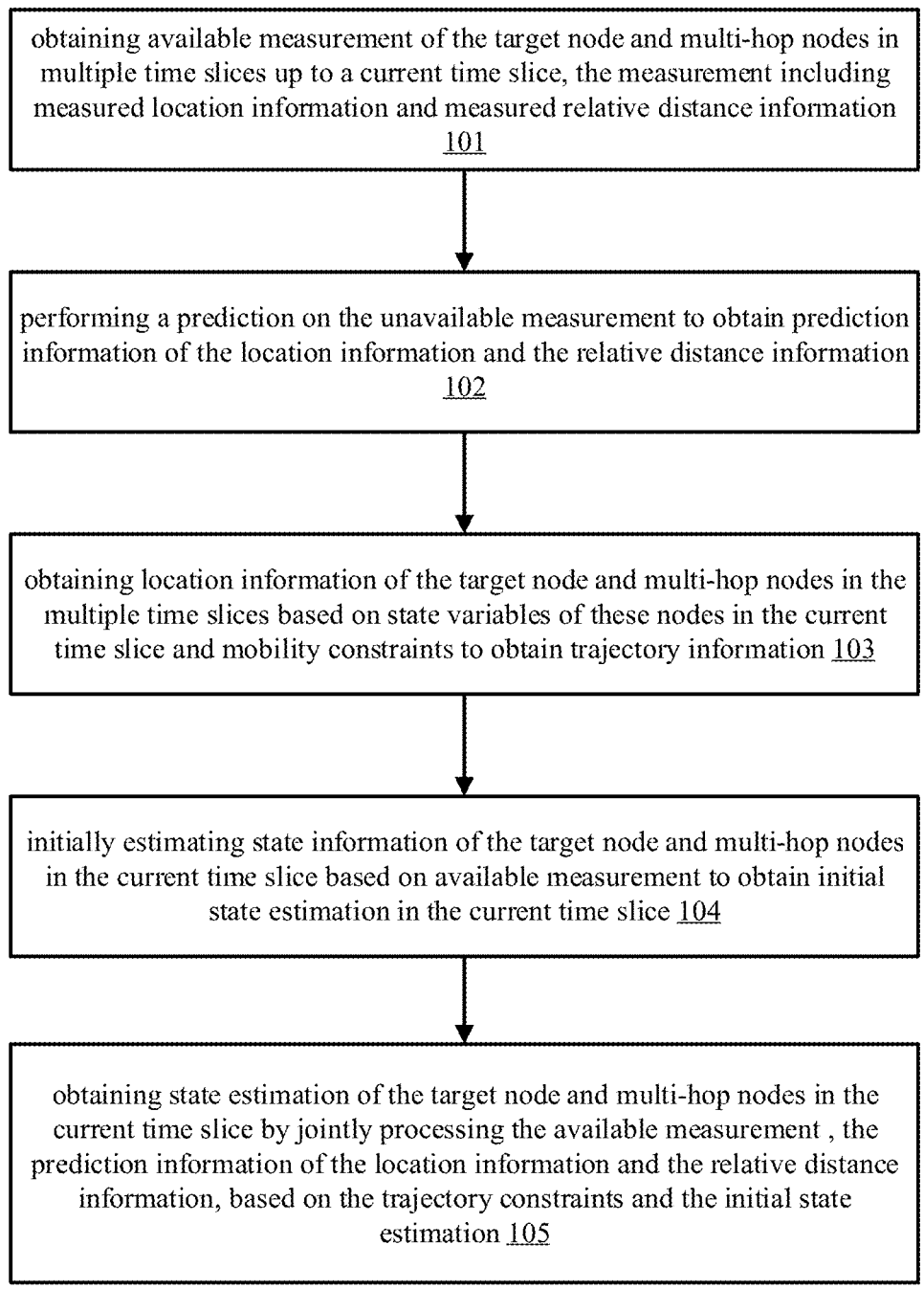
FIG. 1 is a flowchart illustrating a method for obtaining location information according to embodiments of the present disclosure.

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

Terms used herein in the description of the present disclosure are merely for the purpose of describing specific embodiments, but should not be construed to limit the present disclosure. As used in the description of the disclosure and the appended claims, terms "a," "an," and "the" in singular forms intend to include plural forms, unless clearly indicated in the context otherwise. It should also be understood that, as used herein, term "and/or" represents and contains any one and all possible combinations of one or more listed items.

It should be understood that, although terms such as "first", "second" and "third" may be used herein to describe various objects, these objects should not be limited by these terms. These terms are only used for distinguishing one object from another object. For example, a first object may also be called as a second object, and similarly, the second object may also be called as the first object, without departing from the scope of the present disclosure. Depending on the context, the term "if" may be understood to mean "when" or "upon" or "in response to the determination of".

Real-time and high-precision location information is useful for many wireless networks. Under normal circumstances, an existing localization system, such as global locating satellite system (GNSS), can offer these wireless networks with such location information.

However, equipping a GNSS receiver for each node of the wireless network may cause high cost and power consumption. In addition, under harsh environmental conditions (such as urban canyons and forests), signals of the GNSS are susceptible to interference of noises. In this case, the precision of the location information provided by the GNSS receiver may be reduced. A cooperative localization system can improve the location precision through effective cooperation among nodes of the network. In the cooperative localization system, all nodes can generally be divided into reference nodes and user nodes. The location information of the reference nodes can be obtained by themselves through existing localization methods. The location information of the user nodes cannot be obtained by themselves, but can be obtained through cooperation with other nodes. The performance of the cooperative localization system is closely related with the data fusion algorithm. The extended Kalman filter algorithm and the belief propagation algorithm are commonly used cooperative localization methods. Other cooperative localization methods can include the unscented Kalman filter algorithm, the least square method and the maximum likelihood estimation. The extended Kalman filter algorithm has low complexity, which approximates a nonlinear cooperative localization system by a linear system. This approximation greatly degrades localization performance of this cooperative localization system. The unscented Kalman filter algorithm is to approximate a nonlinear cooperative localization system using a nonlinear transformation, such that this cooperative localization algorithm has better performance than the extended Kalman filter algorithm. The belief propagation algorithm based on a factor graph, such as a sum-produce algorithm over a wireless network (SPAWN) algorithm, is also widely used. This algorithm is sensitive to the initial location precision, such that this algorithm can provide high localization precision in a static or quasi-static network environment. However, when used in a high-speed environment, the error of the initial estimated location is relatively large, such that the localization precision of this algorithm is low. Performances of the least square method and the maximum likelihood estimation are asymptotically optimal under a condition of Gaussian white noise. However, since a target problem is non-convex, solving such the target problem is relatively difficult.

The aforementioned cooperative localization systems can be divided into centralized systems and distributed systems. In the centralized cooperative localization system, all computations are executed in a central processing node. Before the computations, the central processing node needs to collect the measurement of all nodes in the network. These centralized systems have high localization precision. However, when applied to a large-scale network, these centralized systems may lead to excessive communication burden and high computational complexity. The distributed systems can effectively reduce communication burden and computational complexity at the expense of certain localization precision degradation. For example, in the distributed cooperative localization system, the computation of the location of each node is done by itself based on the local measurement with its neighboring nodes.

However, all the aforementioned cooperative localization algorithms only consider the measurements in a current time slice. When the movement speed of nodes is relatively high or the number of connections is insufficient, the localization precision of these algorithms is relatively poor or even divergence.

In view of the localization problem of nodes in a large-scale network, the present disclosure provides a distributed cooperative localization system based on joint processing of space-time domains and a same method.

To solve a problem that some nodes in the large-scale mobile network cannot be self-located and a problem of insufficient number of connections, the present disclosure fuses relative distance information and location information of a target node and multi-hop nodes in multiple consecutive time slices up to the current time slice, based on trajectory constraints of nodes, to locate the target node.

With the distributed cooperative localization method, in each time slice, the target node collects available location information and available relative distance information of the target node and multi-hop nodes in multiple consecutive time slices up to the current time slice. Based on the available measurement of the target node and the multi-hop nodes, unavailable measurement of these nodes in the considered multiple time slices caused by the transmission delay is predicted. Based on state variables of the target node and multi-hop nodes in the current time slice, the trajectory information of these nodes in the multiple consecutive time slices is obtained. Based on the available measurement, an existing cooperative localization method is used to compute initial state estimation of the target node and the multi-hop nodes in the current time slice, as initial values for the jointly processing of the measurements in multiple time slices in space-time domains. Based on the trajectory constraints and initial state estimation of nodes, the available measurement and the prediction information in multiple time slices are fused to obtain a high-precision state estimation of the target node in the current time slice.

That is, location information and relative distance information of the target node and multi-hop nodes in the multiple time slices are used to locate the target node. The trajectory information of the target node and the multi-hop nodes in the multiple time slices is obtained based on state information and mobility constraints of the target node and multi-hop nodes in the current time slice. Based on trajectory constraints of nodes, all measurement (includes the available measurement information and the prediction information) of the target node and multi-hop nodes in the multiple time slices is processed in the space-time domains to obtain the location estimation of the target node in the current time slice. The method and system can effectively improve the localization precision of nodes and the reliability of localization results. In some embodiments, whether the measurement is available or unavailable depending on the number of hops with the target node. In the distributed network, the obtaining of the measurement by the target node needs performing multi-hop communication by intermediate nodes. A delay may occur in the multi-hop communication. The measurement includes location information of the target node and the multi-hop nodes and relative distance information between the target node and the multi-hop nodes. For example, in a case of 1 hop, the location measurement of the current and previous time slices is available to the target node; the relative distance measurement of a current time slice is unavailable to the target node, while the relative distance measurement of previous time slices is available to the target node. In a case of 2 hops, the location measurement of a current time slice is unavailable to the target node, while the location measurement of previous time slices is available to the target node; the relative distance measurement of a current time slice and a previous time slice adjacent to the current time slice is unavailable, while the relative distance measurement of other time slices is available.

In detail, the method may include the following.

(1) In each time slice, the caching module caches the available measurement of the target node and multi-hop nodes in multiple consecutive time slices up to the current time slice and sends the available measurement to the predicting module.

(2) In a distributed network, obtaining the measurement of the multi-hop nodes needs performing multi-hop communication by intermediate nodes. That is, the target node cannot obtain a subset of the measurement of the multi-hop nodes due to multi-hop transmission delay. The predicting module predicts unavailable measurement caused by multi-hop transmission delay of the target node and the multi-hop nodes in multiple time slices up to the current time slice, to obtain prediction information of the target node and multi-hop nodes in the multiple time slices, and sends the available measurement and the prediction information to the jointly processing module.

(3) The obtaining module obtains the location information of the target node and multi-hop nodes in multiple consecutive time slices up to the current time slice based on mobility constraints and state variables of the target node and multi-hop nodes in the current time slice, to obtain the trajectory information of the target node and multi-hop nodes in the multiple time slices, and sends the trajectory information to the jointly processing module.

(4) The initially estimating module initially estimates the state information of the target node and multi-hop nodes in the current time slice through a traditional cooperative localization method based on the available measurement, and sends the initial state estimation to the jointly processing module.

(5) The jointly processing module uses the initial state estimation of the target node and multi-hop nodes provided by the initially estimating module as initial values for solving state estimation of the target node and multi-hop nodes, and uses trajectory constraints to jointly process the available measurement and the prediction information of the target node and multi-hop nodes in the multiple time slices to obtain the state estimation of the target node and multi-hop nodes in the current time slice. The state estimation includes the location estimation of the target node in the current time slice.

Based on the trajectory constraint of each node in the system, the present disclosure jointly processes the available measurement and the prediction information of the target node and multi-hop nodes in the multiple consecutive time slices in space-time domains. With the cooperation in the time domain, the localization precision of nodes and the stability of localization result can be effectively increased. In addition, the computations are distributed to each node in the system, which can effectively reduce the communication burden of the system and the computational complexity of the network.

FIG. 1 is a flowchart illustrating a method for obtaining location information according to embodiments of the present disclosure. As illustrated in FIG. 1, the method includes the following.

At block 101, available measurement of the target node and multi-hop nodes in multiple consecutive time slices up to a current time slice is obtained. The measurement includes measured location information of the target node and multi-hop nodes, and measured relative distance between the target node and the multi-hop nodes.

At block 102, unavailable measurement caused by multi-hop transmission delay is predicted based on the available measurement to obtain prediction information of location information and the relative distance information.

At block 103, location information of the target node and multi-hop nodes in the multiple time slices is obtained based on state variables of these nodes in the current time slice and the mobility constraints to obtain trajectory information.

At block 104, state information of the target node and multi-hop nodes in the current time slice is initially estimated based on the available measurement to obtain initial state estimation in the current time slice.

At block 105, state estimation of the target node and multi-hop nodes in the current time slice is obtained by jointly processing the available measurement and the prediction information of the location information and the relative distance information, based on the trajectory constraints and the initial state estimation in the current time slice. The state estimation includes the location estimation of the target node.

Each node in the distributed cooperative localization system based on the joint processing in space-time domains includes: a caching module of available measurement of multiple time slices, a predicting module of unavailable measurement, an obtaining module of trajectory information of nodes, an initially estimating module of state information of nodes, and a jointly processing module of space-time domains. The distributed cooperative localization method may include the following.

(1) With the distributed cooperative localization system, each node in the network is self-located by the node via cooperation with the neighboring nodes. The node to be located may be represented by m, which is also referred to as the target node. All nodes in multi-hop range of the target node m may be represented by $\xi_m$, which includes the target node m and the multi-hop nodes. A node in $\xi_m$ may be represented by n or j, which may be the target node m or a multi-hop node. A location measurement model of the reference nodes in and a relative distance measurement model between all nodes of the distributed cooperative localization system may be determined as follows:

$$\tilde{x}_n^t = x_n^t + b_n^t;$$

$$r_{nj}^t = \|x_n^t - x_j^t\| + \mu_{nj}^t;$$

where, $x_n^t$ represents the real location of node n in a time slice of t, $\tilde{x}_n^t$ represents the location measurement of a reference node n, $b_n^t$ represents a measurement noise of the location measurement, $r_{nj}^t$ represents a measurement value of relative distance between the node n and the node j, $\|x_n^t - x_j^t\|$ represents a real distance, and $\mu_{nj}^t$ represents a measurement noise of the relative distance.

(2) In a current time slice of k, the target node m collects the available information in K consecutive time slices up to a current time slot. When K is large, the information long time ago will be used to localize the target node, which has little contribution to the localization of the target node and meanwhile the computational complexity will significantly increase. Therefore, the value of K should be properly chosen according to required location estimation accuracy and computational resources of the system. Let $\tau = k - K + 1$ and $\mathcal{T} = \{\tau, \tau+1, \ldots, k\}$. Available location measurement of the target node m and the multi-hop nodes in K consecutive time slices from a time slice of $\tau$ to the current time slice of k and available relative distance measurement between the target node and multi-hop nodes are represented by:

$$\begin{cases} \tilde{x}_m^{0:k-1}, \tilde{x}_m^k \\ \tilde{x}_n^{0:k-\ell}, \tilde{x}_n^{k-\ell+1}, n \in g_{m,\ell}, \ell \in \mathbb{R}^+ \\ r_{mn}^{0:k}, n \in g_{m,1} \\ r_{nj}^{0:k-\ell}, n \in g_{m,\ell}, j \in \xi_m, \ell \in \mathbb{R}^+ \end{cases};$$

where, $g_{m,l}$ represents a set of l-hop nodes of the target node m, $\hat{x}_n^t$ represents the location estimation of node n in the time slice of $t \in \mathcal{T}$. In a case that node n is a user node, $\tilde{x}_n^t$ is empty. The available measurement is sent to the predicting module of unavailable measurement.

(3) The predicting module predicts unavailable measurement caused by multi-hop transmission delay of the target node and multi-hop nodes in multiple time slices up to the current time slice based on available measurement of the nodes in $\xi_m$. The available measurement and prediction information of the location information of the nodes in $\xi_m$ are represented by $\bar{p}^\mathcal{T}$, whereas available measurement and prediction information of the relative distance among these nodes are represented by $\rho^\mathcal{T}$. The available measurement and prediction information are sent to the jointly processing module of space-time domains.

(4) Based on variables $x_n^k$ related to the location information of the node $n \in \xi_m$ in the current time slice, together with variables related to mobility state of the node $n \in \xi_m$ such as speed $v_n^k$ and acceleration $a_n^k$, the location information of node $n \in \xi_m$ in (K−1) previous time slices of the current time slice is derived. For example, each node moves along a straight line with a constant acceleration in K consecutive time slices including the current time slice, based on the mobility state of each node in the current time slice k, the location information of the node n in the time slice $t \in \mathcal{T}$ is represented as:

$$x_n^t = x_n^k + v_n^k \Delta T_t + \frac{1}{2} a_n^k (\Delta T_t)^2, n \in \xi_m, t \in \mathcal{T},$$

where, $\Delta T_t = (t-k)\Delta T$, $\Delta T$ represents the length of each time slice. The above formula shows the trajectory information of node n in K time slices from the time slice of τ to the time slice of k. The state variable of node n in the current time slice k is represented by:

$$z_n^k = [(x_n^k)^T, (v_n^k)^T, (a_n^k)^T]^T.$$

The trajectory information of node n may be represented by:

$$x_n^t = F^t z_n^k, n \in \xi_m, t \in \mathcal{T},$$

where, $$F^t = [I_2, \Delta T_t I_2, \frac{1}{2}(\Delta T_t)^2 I_2],$$

the trajectory information of the nodes is sent to the jointly processing module of space-time domains.

(5) The initially estimating module of state information of nodes in $\xi_m$ uses an existing cooperative localization method based on the available measurement, such as extended Kalman filter algorithm and unscented Kalman filter algorithm, to calculate initial state estimation of the nodes in $\xi_m$ in the current time slice k, as initial values for jointly processing of all measurement in the multiple time slices. The initial state estimation of the nodes in $\xi_m$ is sent to the jointly processing module of space-time domains.

(6) The joint processing module of space-time domains fuses the available measurement and the prediction information of all nodes included in $\xi_m$ in the multiple time slices based on trajectory constraints of these nodes and the initial state estimation provided by the initially estimating module, to obtain state estimation of the nodes in $\xi_m$ in the current time slice. The state estimation includes the location estimation of the target node in the current time slice. For example, $\alpha^k = \text{vec}\{z_n^k\}_{n \in \xi_m}$, based on the available and prediction information of the location information $\bar{p}^\mathcal{T}$ and the relative distance information $\rho^\mathcal{T}$ in the multiple time slices, the maximum likelihood estimation of $\alpha^k$ is represented by:

$$(\hat{\alpha}^k)_{MLE} = \underset{\alpha^k}{\arg\max}\, p(\bar{p}^\mathcal{T}, \rho^\mathcal{T} | \alpha^k).$$

(7) Results of the jointly processing module of space-time domains are outputted as the state estimation of the target node in the current time slice. The state estimation includes the location estimation of the target node in the current time slice.

Figure 2:
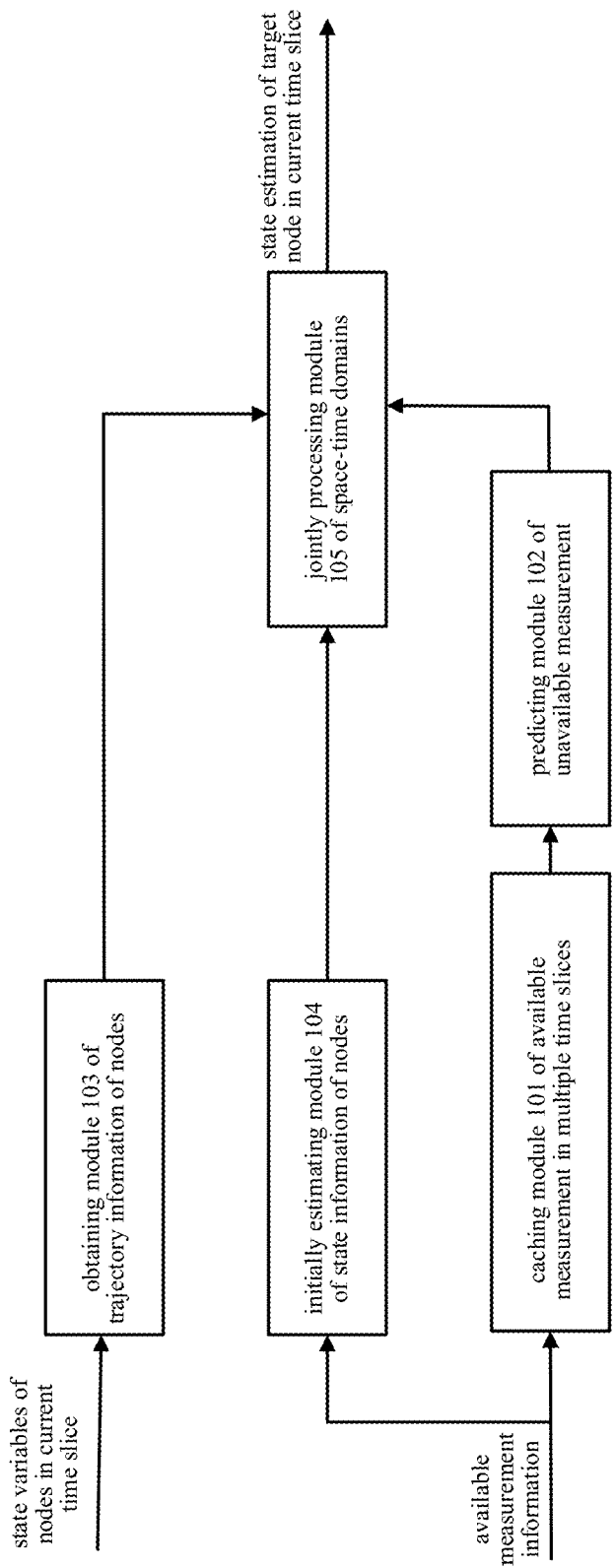
FIG. 2 is a block diagram illustrating a distributed cooperative localization method based on jointly processing of space-time domains according to some embodiments of the present disclosure.

FIG. 2 illustrates a block diagram of the cooperative localization system including the caching module 101 of available measurement of multiple time slices, the predicting module 102 of the unavailable measurement, the obtaining module 103 of trajectory information of nodes, the initially estimating module 104 of state information of nodes, and the jointly processing module 105 of space-time domains. The available measurement is input to both the caching module 101 and the initially estimating module 104. An output terminal of the caching module 101 is connected to an input terminal of the predicting module 102. The state variables of nodes in the current time slice is input to the obtaining module 103. Output terminals of the predicting module 102, the obtaining module 103, and the initially estimating module 104 are connected to an input terminal of the jointly processing module 105.

For example, the algorithm of obtaining the initial state estimation of the target node and multi-hop nodes is the extended Kalman filter algorithm, measurement information of the nodes within two-hop range of the target node (including the target node) in 3 (where K=3) time slices are fused based on the maximum likelihood estimation criterion, and the resulting problem is solved by a sequence quadratic program (SQP) algorithm. For example, a dynamic network has 113 nodes. 13 of the 113 nodes are reference nodes, which can obtain their own location through the GNSS receiver (a certain error may occur in the measurement of the GNSS receiver), and the other nodes are user nodes, which can only obtain their location via cooperative localization. All nodes are randomly distributed within an area of 1000 m×1000 m. Due to limitations of distance and power consumption and occlusion of obstacles, each node can communicate with some nodes but not all nodes in the network. Here, a communication radius of each node is set to be 200 m. Through communication links, the relative distance with neighboring nodes and the location information of neighboring nodes can be obtained. In addition, the initial velocities of all nodes are set to 40 m/s, accelerations all meet a Gaussian distribution with a mean value of 0 m/s² and a standard deviation of 0.2 m/s². For the reference nodes, a standard deviation of noises of the location information obtained through the GNSS receiver is set to 4 m, and the standard deviation of noises of the relative distance measurement between nodes is set to 0.4 m.

Each node in the distributed cooperative localization system based on the joint processing in space-time domains includes: a caching module of available measurement of multiple time slices, a predicting module of unavailable measurement, an obtaining module of trajectory information of nodes, an initially estimating module of state information of nodes, and a jointly processing module of space-time domains. The distributed cooperative localization method may include the following.

(1) To locate the target node m, a location measurement model of reference nodes and a relative distance measurement model between all nodes of the distributed cooperative localization system may be determined as follows:

$$\tilde{x}_n^t = x_n^t + b_n^t;$$

$$r_{nj}^t = h(x_n^t, x_j^t) + \mu_{nj}^t = \|x_n^t - x_j^t\| + \mu_{nj}^t;$$

where, n and j represents nodes in $\xi_m$ including the target node and the multi-hop nodes, $x_n^t$ represents the real location of a node $n \in \xi_m$ in a time slice of t, $\tilde{x}_n^t$ represents location measurement of a reference node n obtained by the GNSS receiver, $b_n^t$ represents a measurement noise of the location information meeting a Gaussian distribution with mean value of 0 and a covariance matrix of $U_n^t$, $r_{nj}^t$ represents a measurement value of relative distance between the node n and the node j, $h(x_n^t, x_j^t) = \|x_n^t - x_j^t\|$ represents a real distance, and $\mu_{nj}^t$ represents a measurement noise of the relative distance meeting a Gaussian distribution with mean value of 0 and a variance of $(\sigma_{nj}^t)^2$.

(2) In the distributed network, the obtaining of the available measurement by the nodes needs performing multi-hop communication by intermediate nodes. A delay may occur in the multi-hop communication. That is, in the current time slice of k, the target node m can obtain the location information of multi-hop nodes in $g_{m,1}$ in multiple time slices up to the current time slice of k and the relative distance among the multi-hop nodes in $g_{m,1}$ in multiple time slices up to a first previous time slice of (k−1) adjacent to the current time slice, and obtain the location information of multi-hop nodes in $g_{m,2}$ in multiple time slices up to the first previous time slice of (k−1) adjacent to the current time slice and the relative distance among the multi-hop nodes in $g_{m,2}$ in multiple time slices up to a second previous time slice of (k−2) adjacent to the first previous time slice of (k−1), and so on. With the increase of the number (E) of hops, the delay occurred in the communication between the multi-hop nodes in $g_{m,l}$ with the target node increases accordingly, which reduces the contribution of these distant nodes to the localization performance of the target node and increase the computational complexity. For example, when the nodes within two-hop range of the target node (including the target node) are considered, the nodes may be represented by $\xi_m = \{m\} \cup g_{m,1} \cup g_{m,2}$. In the current time slice of k, the caching module of the target node m caches the available location measurement of the nodes in and the available relative distance measurement among the nodes in $\xi_m$ in recent K consecutive time slices from the time slice of $\tau$ to the time slice of k:

$$\begin{cases} \tilde{x}_m^{0:k-1}, \tilde{x}_m^k \\ \tilde{x}_n^{0:k-\ell}, \tilde{x}_n^{k-\ell+1}, n \in g_{m,\ell}, \ell \in \{1,2\} \\ r_{mn}^{0:k}, n \in g_{m,1} \\ r_{nj}^{0:k-\ell}, n \in g_{m,\ell}, j \in \xi_m, \ell \in \{1,2\} \end{cases};$$

where, $\hat{x}_n^t$ represents estimated location of the node n in the time slice of t. In a case that the node n is a user node, $\tilde{x}_n^t$ is empty. The available measurement is sent to the predicting module of unavailable measurement.

(3) Not all measurement of all nodes in $\xi_m$ in multiple time slices up to the current time slice of k can be obtained by the caching module of the target node m. The predicting of unavailable measurement module predicts the unavailable measurement of all multi-hop nodes in multiple time slices up to the current time slice based on available measurement of all nodes in $\xi_m$:

$$\begin{cases} \bar{x}_m^k = f_m(\hat{x}_m^{0:k-1}, \tilde{x}_m^k) \\ \bar{x}_n^{k-\ell+1:k} = f_\ell(\hat{x}_n^{0:k-\ell}, \tilde{x}_n^{k-\ell+1}), n \in g_{m,\ell}, \ell \in \{1,2\} \\ \bar{\rho}_{nj}^{k-\ell+1:k} = h_\ell(r_{nj}^{0:k-\ell}), n \in g_{m,\ell}, j \in \xi_m, \ell \in \{1,2\} \end{cases};$$

where, $f_m$, and $f_l$ represent prediction functions of the location information of nodes, and $h_l$ represents a prediction function of the relative distance information. The location information of nodes and the relative distance information are predicted through the extended Kalman filter algorithm. Further, there is a following formula:

$$\begin{cases} \bar{x}_m^{0:k-1} = \hat{x}_m^{0:k-1} \\ \bar{x}_n^{0:k-\ell} = \hat{x}_n^{0:k-\ell}, n \in g_{m,\ell}, \ell \in \{1,2\} \\ \bar{\rho}_{mn}^{0:k} = r_{mn}^{0:k}, n \in g_{m,1} \\ \bar{\rho}_{nj}^{0:k-\ell} = r_{nj}^{0:k-\ell}, n \in g_{m,\ell}, j \in \xi_m, \ell \in \{1,2\} \end{cases};$$

let $\bar{p}\mathcal{T} = \{\bar{x}_n^{0:k}, n \in \xi_m\}$ represents available measurement and prediction information of the location information used for locating the target node m, and $\rho\mathcal{T} = \{\bar{\rho}_{nj}^{0:k}, n, j \in \xi_m\}$ represents available measurement and prediction information of the relative distance information. In some examples, the noise of $\bar{x}_n^t$ meets a Gaussian distribution with the mean value of zero and the covariance matrix of $\Phi_n^t$, and the noise of $\bar{\rho}_{nj}^t$ meets a Gaussian distribution with the mean value of zero and the variance of $\eta_{nj}^t$. The available measurement and the prediction information are sent to the jointly processing module of space-time domains.

(4) The measurement in K time slices from the time slice of $\tau$ to the time slice of k is related to not only the location of the nodes in $\xi_m$ in the current time slice of k, but also the location of nodes in (K−1) time slices before the current time slice. Therefore, based on the variables related to the location of the nodes in $\xi_m$ in the current time slice, together with variables related to mobility state of these nodes, such as speed and acceleration, the location information of these nodes in the (K−1) time slices before the current time slice can be obtained. For example, in the time slice of k, for the node $n \in \xi_m$, the speed is represented by $v_n^f$, and the acceleration is represented by $a_n^k$. Considering a fact that measurement before a large number of time slices from the current time slice has little contribution to the localization performance in the current time slice, K is set to a small value, for example, K=3. In this case, if each node moves along a straight line with a constant acceleration in the K time slices, based on the mobility state of each node in the time slice of k, the location information of the node n in the time slice $t \in \mathcal{T}$ may be represented as:

$$x_n^t = x_n^k + v_n^k \Delta T_t + \tfrac{1}{2} a_n^k (\Delta T_t)^2, n \in \xi_m, t \in \mathcal{T},$$

where, $\Delta T_t = (t-k)\Delta T$, $\Delta T$ represents the length of each time slice. All location information of the node n in K time slices from the time slice of $\tau$ to the time slice of k shows the trajectory of node n in the K time slices.

The state variable of node n in the time slice of k is represented by:

$$z_n^k = [(x_n^k)^T, (v_n^k)^T, (a_n^k)^T]^T;$$

the trajectory information of node n may be represented by:

$$x_n^t = F^t z_n^k, n \in \xi_m, t \in \mathcal{T};$$

where, the matrix $F^t$ may be represented by:

$$F^t = [I_2, \Delta T_t I_2, \tfrac{1}{2}(\Delta T_t)^2 I_2];$$

where, $I_2$ represents an identity matrix of 2×2. The trajectory information of the nodes is sent to the jointly processing module of space-time domains.

(5) In order to improve the effectivity of fusing the available measurement and the prediction information in multiple time slices, the initially estimating module uses the extended Kalman filter algorithm based on available measurement to calculate initial state estimation of the nodes in in current time slice of k, as initial values for the jointly processing of the available measurement and prediction information in multiple time slices. The state information to be estimated of node n in the time slice t is represented by $X_n^t = [(x_n^t)^T, (v_n^t)^T]^T$, where, $x_n^t = [x_n^t, y_n^t]^T$ and $v_n^t = [\dot{x}_n^t, \dot{y}_n^t]^T$. Based on the posterior estimation $\hat{X}_n^{t-1}$ in the time slice of (t−1), the estimation information of the state information in the current time slice is represented as:

$$\hat{X}_n^{t|t-1} = F\hat{X}_n^{t-1};$$

$$\hat{P}_n^{t|t-1} = F\hat{P}_n^{t-1}F^T + Q_n^t;$$

where, the matrix F is represented by:

$$F = \begin{bmatrix} I_2 & \Delta T I_2 \\ 0_2 & I_2 \end{bmatrix};$$

where, $O_2$ represents an all-zero matrix of 2×2. $\hat{P}_n^{t-1}$ represents a covariance matrix of the estimation $\hat{X}_n^{t-1}$, and $Q_n^t$ represents a covariance matrix of system modeling noises.

The Jacobian matrix of the measurement data $r_n^t$ regarding to $X_n^t$ is calculated as:

$$H_n^t = \begin{bmatrix} \frac{\partial r_n^t}{\partial x_n^t} & \frac{\partial r_n^t}{\partial y_n^t} & \frac{\partial r_n^t}{\partial \dot{x}_n^t} & \frac{\partial r_n^t}{\partial \dot{y}_n^t} \end{bmatrix};$$

the measurement residual and its covariance matrix are represented by:

$$\Delta r_n^t = r_n^t - h(\hat{x}_n^{t|t-1}, :);$$

$$S_n^t = H_n^t \hat{P}_n^{t|t-1}(H_n^t)^T + R_n^t;\text{ where,}$$

$$h(\hat{x}_n^{t|t-1}, :) = \begin{bmatrix} h(\hat{x}_n^{t|t-1}, \hat{x}_{j_1}^t) \\ h(\hat{x}_n^{t|t-1}, \hat{x}_{j_2}^t) \\ \vdots \\ h(\hat{x}_n^{t|t-1}, \hat{x}_{j_{N_n}}^t) \end{bmatrix};$$

where, $j_1, j_2, \ldots, j_{N_n}$ represent all neighboring nodes of node n, $N_n$ represents the number of neighboring nodes of the node n. The matrix $R_n^t$ is a diagonal matrix, which is represented by:

$$R_n^t = \text{diag}\{(\sigma_{nj_1}^t)^2, (\sigma_{nj_2}^t)^2, \ldots, (\sigma_{nj_{N_n}}^t)^2\}.$$

The Kalman gain is calculated as:

$$K_n^t = \hat{P}_n^{t|t-1}(H_n^t)^T(S_n^t)^{-1};$$

and the posterior estimation of $X_n^t$ and the covariance matrix are represented by:

$$\hat{X}_n^t = \hat{X}_n^{t|t-1} + K_n^t \Delta r_n^t;$$

$$\hat{P}_n^t = \hat{P}_n^{t|t-1} - K_n^t S_n^t (K_n^t)^T.$$

In the time slice of k, the target node m can obtain the available measurement of the nodes in $g_{m,1}$ in multiple time slices up to the time slice of (k−1). Thus, with the method, the posterior state estimation of the nodes in $g_{m,1}$ in multiple time slices up to the time slice of (k−1) can be obtained. To obtain the state information in the time slice of k, one-step prediction is made based on the posterior state estimation in the time slice of (k−1):

$$\hat{X}_n^{k|k-1} = F\hat{X}_n^{k-1};$$

the predicted value $\hat{X}_n^{k|k-1}$ is used as the initial state estimation in the time slice of k. Base on the above, two-step prediction are required for the nodes in $g_{m,2}$ to obtain the initial state estimation in the current time slice of k. The estimation values are input to the jointly processing module of space-time domains as the initial state estimation of the nodes.

(6) The joint processing module of space-time domains fuses the available measurement and the prediction information of all nodes included in $\xi_m$ in multiple time slices based on trajectory constraints and initial state estimation of the nodes in $\xi_m$ provided by the initially estimating module, to obtain the state estimation of the nodes in $\xi_m$ in the current time slice. For example, $\alpha^k = \text{vec}\{z_n^k\}_{n \in \xi_m}$ which includes state variables of the nodes in $\xi_m$ in the time slice of k. Based on the available measurement and prediction information of the location information $\bar{p}^{\mathcal{T}}$ and the relative distance information $\bar{\rho}^{\mathcal{T}}$ in multiple time slices, the maximum likelihood estimation of $\alpha^k$ is represented by:

$$(\hat{\alpha}^k)_{MLE} = \arg\max_{\alpha^k} p(\bar{p}^{\mathcal{T}}, \rho^{\mathcal{T}} | \alpha^k).$$

Under the assumption of white Gaussian noise, the above equation is equivalent to a nonlinear least square problem:

$$\min_{\alpha^k \in R^{6N_m \times 1}} \sum_{\substack{t \in \mathcal{J} \\ n \in \xi_m, j \in \xi_m \setminus n}} \frac{c_{nj}^t}{(\eta_{nj}^t)^2}(\rho_{nj}^t - \|x_n^t - x_j^t\|)^2 +$$

$$\sum_{t \in \mathcal{J}, n \in \xi_m} (x_n^t - \bar{x}_n^t)^T (\Phi_n^t)^{-1}(x_n^t - \bar{x}_n^t)$$

$$\text{s.t. } x_n^t = F^t z_n^k, n \in \xi_m, t \in \mathcal{J},$$

$$\|\dot{x}_n^k\| \le v_{max},$$

$$\|\ddot{a}_n^k\| \le a_{max}.$$

where, $N_m$ represent the number of nodes in $\xi_m$, $c_{nj}^t = 1$ denotes that the node n and the node j are connected, and $c_{nj}^t = 0$ denotes that the node n and the node j are not connected.

(7) The above nonlinear least square problem is solved by the SQP algorithm by means of MATLAB, to obtain the final state estimation of the nodes in $\xi_m$ in the current time slice, which includes location estimation of the target node in the current time slice.

Figure 3:
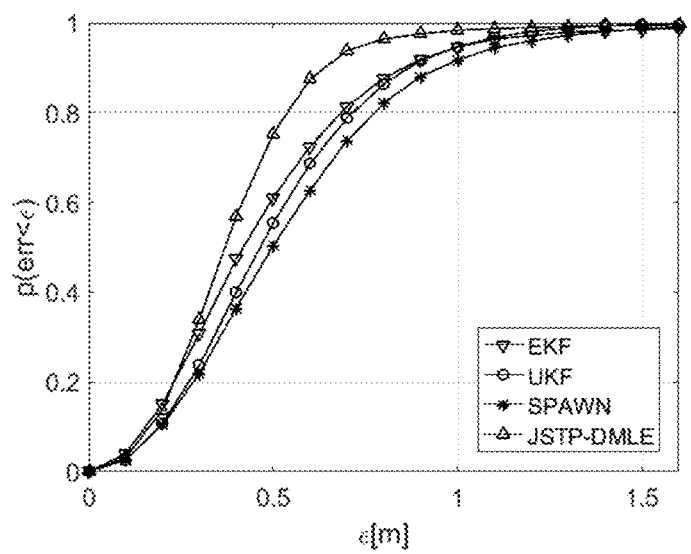
FIG. 3 is a schematic diagram illustrating a cumulative density curve of the localization error of user nodes according to some embodiments of the present disclosure.
Figure 4:
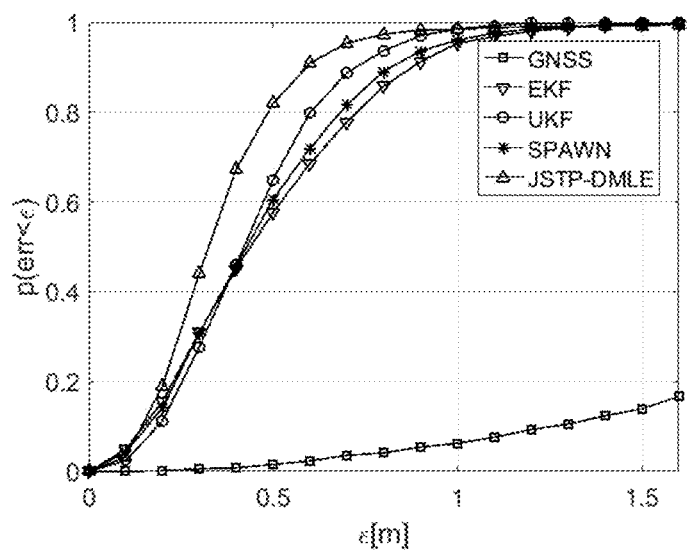
FIG. 4 is a schematic diagram illustrating a cumulative density curve of the localization error of reference nodes according to some embodiments of the present disclosure.

For example, the localization error of node m in time slice of k is denoted by $e(x_m^k) = \|\hat{x}_m^k - x_m^k\|$, where $\hat{x}_m^k$ is the estimated location and $x_m^k$ is the real location. FIG. 3 is a schematic diagram illustrating a cumulative densities curve of localization error of user nodes according to some embodiments of the present disclosure. FIG. 4 is a schematic diagram illustrating a cumulative densities curve of localization error of reference nodes according to some embodiments of the present disclosure.

The distributed cooperative localization method based on joint processing of space-time domains (also referred to as JSTP-DMLE) is proposed in the present disclosure, compared with the EKF (extended Kalman filter algorithm), the UKF (unscented Kalman filter algorithm) and the SPAWN which is a cooperative localization algorithm based on the factor graph. In FIG. 4, the "GNSS" represents the cumulative density curve of localization error of the reference nodes obtained by the GNSS receiver.

From FIGS. 3 and 4, when applied to large-scale mobile networks, the JSTP-DMLE can provide higher localization precision than the competing algorithms. In addition, based on the measurement information of the GNSS receiver, the cooperative localization method can further improve the localization precision of reference nodes. For example, the mean square error of locating the nodes may be represented by RMSE=$\mathbb{E}\{e(x_m^k)^2\}$. For the user nodes, the RMSE of the JSTP-DMLE is 0.4561 m, the RMSE of the EKF is 0.6031 m, the RMSE of the UKF is 0.5762 m, and the RMSE of the SPAWN is 0.6320 m. For the reference nodes, the RMSE of the JSTP-DMLE is 0.4182 m, the RMSE of the EKF is 0.5718 m, the RMSE of the UKF is 0.4902 m and the RMSE of the SPAWN is 0.5409 m.

Figure 5:
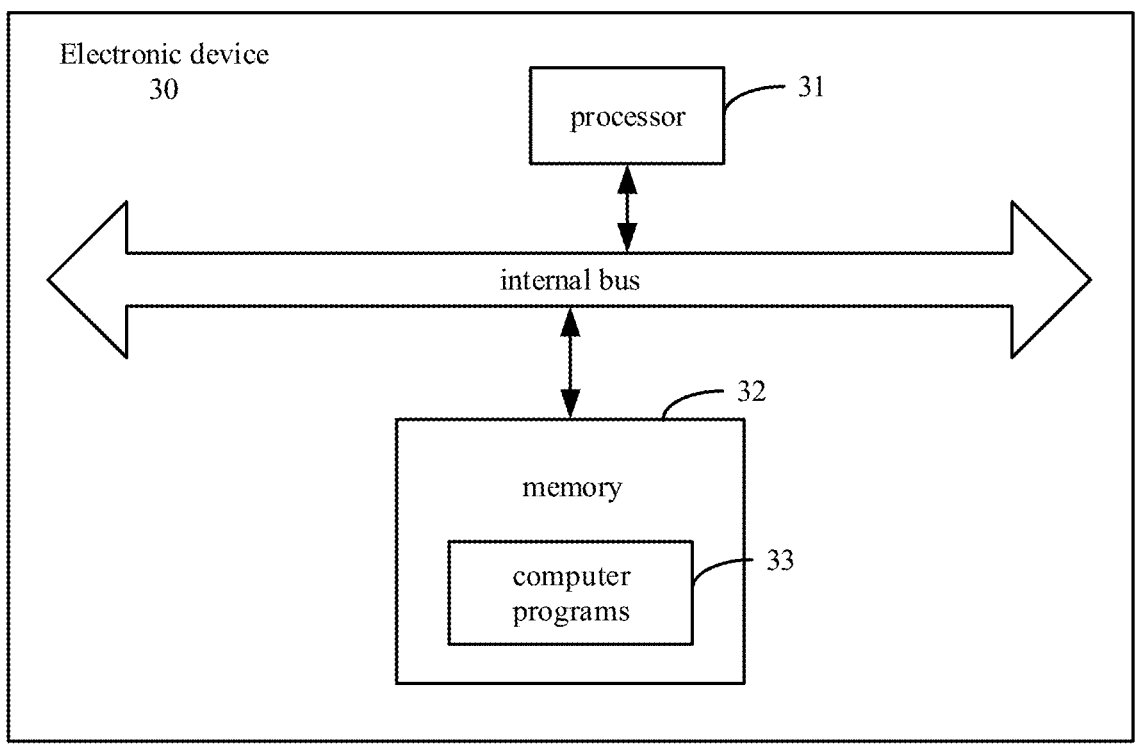
FIG. 5 is a block diagram illustrating an electronic device according to some embodiments of the present disclosure.

FIG. 5 is a block diagram illustrating an electronic device 30 according to an example embodiment of the present disclosure. The electronic device 30 includes a processor 31 and a memory 32. The memory 32 is configured to store executable instructions. The memory 32 includes computer programs 33. The processor 31 is configured to execute blocks of the above-mentioned method.

The processor 31 is configured to execute the computer programs 33 included in the memory 32. The processor 31 may be a central processing unit (CPU) or another a general-purpose processor, a digital signal processor (DSP), an application specific integrated circuit (ASIC), a field-programmable gate array (FPGA), another programmable logic device, a discrete gate, a transistor logic device, a discrete hardware component, and the like. The general-purpose processor may be a microprocessor or any conventional processor.

The memory 32 is configured to store computer programs related to the method. The memory 32 may include at least one type of storage medium. The storage medium includes a flash memory, a hard disk, a multimedia card, a card-type memory (such as, a SD (secure digital) or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, etc. The device may cooperate with a network storage device that performs a storage function of the memory by a network connection. The memory 32 may be an internal storage unit of the device 30, such as a hard disk or a memory of the device 30. The memory 32 may also be an external storage device of the device 30, such as a plug-in hard disk, a smart media card (SMC), a secure digital (SD) card, a flash card, disposed on the device 30. Further, the memory 32 may also include both the internal storage unit of the device 30 and the external storage device. The memory 32 is configured to store the computer program 33 and other programs and data required by the device. The memory 32 may also be configured to temporarily store data that has been output or will be output.

The various embodiments described herein may be implemented by using the computer readable medium such as computer software, hardware, or any combination thereof. For a hardware implementation, embodiments described herein may be implemented by using at least one of: an application specific integrated circuit (ASIC), a digital signal processor (DSP), a digital signal processing device (DSPD), a programmable logic device (PLD), a field programmable gate array (FPGA), a processor, a controller, a microcontroller, a microprocessor, and an electronic unit designed to perform the functions described herein. For a software implementation, an implementation such as a procedure or a function may be implemented with a separate software module that allows at least one function or operation to be performed. Software codes may be implemented by a software application (or program) written in any suitable programming language, and the software codes may be stored in the memory and executed by the controller.

The electronic device 30 includes, but is not limited to, a mobile terminal, an ultra-mobile personal computer device, a server, and other electronic device with a computing function. (1) The mobile terminal is characterized by having a function of mobile communication and aiming at providing a voice and data communication. Such mobile terminal includes a smart phone (such as iPhone), a multimedia phone, a functional phone, and a low-end phone. (2) The ultra-mobile personal computer device belongs to a category of personal computer, which has a computing and processing function, and generally has a feature of mobile Internet access. Such terminal includes a PDA (personal digital assistant), a MID (mobile Internet device) and a UMPC (ultra mobile personal computer) devices, such as an iPad. (3) The server provides a computing service. A composition of the server includes a processor, a hard disk, a memory, a system bus, etc. The server is similar to the general computer architecture, but because the server only provides a highly reliable service, it requires a higher processing capacity, stability, reliability, security, scalability and manageability. (4) Other electronic device with the computing function may include, but be not limited to, the processor 31 and the memory 32. It may be understood by the skilled in the art that, FIG. 5 is merely an example of the electronic device 30, and does not constitute a limitation of the electronic device 30. The electronic device 30 may include more or less components than illustrated, some combined components, or different components. For example, the electronic device may also include an input device, an output device, a network access device, a bus, a camera device, etc.

The implementation procedure of the functions of each unit in the above device may refer to the implementation procedure of the corresponding actions in the above method, which is not elaborated here.

In some embodiment, there is also provided a storage medium including instructions, such as the memory 32 including instructions. The above instructions may be executed by the processor 31 of the electronic device 30 to perform the above method. In some embodiments, the storage medium may be a non-transitory computer readable storage medium. For example, the non-transitory computer readable storage medium may include the ROM, the random-access memory (RAM), the CD-ROM (compact disc read-only memory), a magnetic tape, a floppy disk, optical data storage device, etc.

A non-transitory computer readable storage medium is provided. When instructions stored in the storage medium are executed by a processor of a terminal, the terminal is enabled to execute the above method for obtaining location information.

In some embodiments, there is also provided a computer program product including executable program codes. The program codes are configured to execute any of the above embodiments of the method when executed by the above device.

Other embodiments of the disclosure may readily be apparent to the skilled in the art after consideration of the specification and practice of the disclosure disclosed herein. This disclosure is intended to cover any modification, use or adaptation of the disclosure, which follows the general principles of the disclosure and includes common knowledge or conventional technical means in the skilled in the art not disclosed in the disclosure. The specification and examples are merely exemplary, with the true scope and the spirit of the disclosure being indicated by the following claims.

It should be understood, the present disclosure is not limited to a precise structure described above and illustrated in the accompanying drawings, and various modifications and changes may be made without departing from the scope of the disclosure. The scope of the disclosure is limited merely by the appended claims.

What is claimed is:

1. A computer-implemented method for obtaining location information, comprising:
    obtaining available measurement of a target node and multi-hop nodes in multiple consecutive time slices up to a current time slice, the measurement comprising measured location information of the target node and the multi-hop nodes and measured relative distance between the target node and the multi-hop nodes;
    predicting unavailable measurement caused by multi-hop transmission delay to obtain prediction information of location information and relative distance information;
    obtaining location information of the target node and the multi-hop nodes in multiple time slices based on state variables of the target node and the multi-hop nodes in the current time slice and mobility constraints to obtain trajectory information, wherein the state variables at least comprise location, velocity and acceleration;
    initially estimating state information of the target node and the multi-hop nodes in the current time slice based on available measurement to obtain initial state estimation in the current time slice; and
    obtaining state estimation of the target node and the multi-hop nodes in the current time slice by jointly processing the available measurement and the prediction information of the location information and the relative distance information, based on trajectory constraints and the initial state estimation in the current time slice, the state estimation comprising the location estimation of the target node in the current time slice;
    wherein the method further comprises:
        establishing a location measurement model of reference nodes represented by:

$$\tilde{x}_n^t = x_n^t + b_n^t;$$

establishing a relative distance measurement model between all nodes represented by:

$$r_{nj}^t = h(x_n^t, x_j^t) + \mu_{nj}^t = \|x_n^t - x_j^t\| + \mu_{nj}^t$$

where, n and j represents nodes in $\xi_m$ including the target node and the multi-hop nodes, $x_n^t$ represents the real location of a node $n \in \xi_m$ in a time slice of t, $\tilde{x}_n^t$ represents location measurement of a reference node obtained by the GNSS receiver, $b_n^t$ represents a measurement noise of the location information meeting a Gaussian distribution with mean value of 0 and a covariance matrix of $U_n^t$, $r_{nj}^t$ represents a relative distance measurement between the node n and the node j, $h(x_n^t, x_j^t) = \|x_n^t - x_j^t\|$ represents a real distance, $\mu_{nj}^t$ represents a measurement noise of the relative distance meeting a Gaussian distribution with mean value of 0 and a variance of $(\sigma_{nj}^t)^2$; and
    in a case that each node in $\xi_m$ moves along a straight line with a constant acceleration, obtaining the location information of the node n in a time slice of $t \in \mathcal{T}$ based on the location information and mobility state of node n in the current time slice of k, where the location information of node n in the time slice of $t \in \mathcal{T}$ is represented by:

$$x_n^t = x_n^k + v_n^k \Delta T_t + \tfrac{1}{2} a_n^k (\Delta T_t)^2, n \in \xi_m, t \in \mathcal{T},$$

where, $\mathcal{T} = \{\tau, \tau+1, \ldots, k\}$, $\tau = k-K+1$, $\Delta T$ represents the length of each time slice, $\Delta T_t = (t-k)\Delta T$, $v_n^k$ represents the speed of node n in the current time slice of k, $a_n^k$ represents the acceleration of node n in the current time slice of k.

2. The method according to claim 1, wherein the available location information of the nodes in $\xi_m$ in multiple consecutive time slices up to the current time slice k and the available relative distance information between the nodes in $\xi_m$ nodes in multiple consecutive time slices up to the current time slice k are determined as:

$$\begin{cases} \hat{x}_m^{0:k-1}, \tilde{x}_m^k \\ \hat{x}_n^{0:k-\ell}, \tilde{x}_n^{k-\ell+1}, n \in g_{m,\ell}, \ell \in \{1,2\} \\ r_{mn}^{0:k}, n \in g_{m,1} \\ r_{nj}^{0:k-\ell}, n \in g_{m,\ell}, j \in \xi_m, \ell \in \{1,2\} \end{cases};$$

where, $\hat{x}_n^t$ represents the location estimation of node n in the time slice of t.

3. The method according to claim 1, wherein the prediction information of the unavailable location information and the relative distance information is represented by:

$$\begin{cases} \bar{x}_m^k = f_m(\hat{x}_m^{0:k-1}, \tilde{x}_m^k) \\ \bar{x}_n^{k-\ell+1:k} = f_1(\hat{x}_n^{0:k-1}, \tilde{x}_n^{k-\ell+1}), n \in g_{m,1}, \ell \in \{1,2\} \\ \rho_{nj}^{k-\ell+1:k} = h_1(r_{nj}^{0:k-1}), n \in g_{m,1}, j \in \xi_m, \ell \in \{1,2\} \end{cases};$$

besides, let $$\begin{cases} \bar{x}_m^{0:k-1} = \hat{x}_m^{0:k-1} \\ \bar{x}_n^{0:k-\ell} = \hat{x}_n^{0:k-\ell}, n \in g_{m,\ell}, \ell \in \{1,2\} \\ \rho_{mn}^{0:k} = r_{mn}^{0:k}, n \in g_{m,1} \\ \rho_{nj}^{0:k-\ell} = r_{nj}^{0:k-\ell}, n \in g_{m,\ell}, j \in \xi_m, \ell \in \{1,2\} \end{cases};$$

where, $f_m$ and $f_e$ represent prediction functions of the location information of nodes, and $h_l$ represents a prediction function of the relative distance information.

4. The method according to claim 1, wherein the trajectory information is represented by:

$$x_n^t = F^t z_n^k, n \in \xi_m, t \in \mathcal{T};$$

$$F^t = [I_2, \Delta T_t I_2, \tfrac{1}{2}(\Delta T_t)^2 I_2];$$

where, $z_n^k$ represents the state variable of node $n \in \xi_m$, $I_2$ represents an identity matrix of 2×2 and $\Delta T$ represents the length of each time slice, $\Delta T_t = (t-k)\Delta T$.

5. The method according to claim 1, wherein obtaining initial state estimation in the current time slice comprises:
performing one-step prediction to obtain the initial state estimation of node $n \in g_{m,1}$ represented by:

$$\hat{X}_n^{k|k-1} = F\hat{X}_n^{k-1};$$

$$F = \begin{bmatrix} I_2 & \Delta T I_2 \\ 0_2 & I_2 \end{bmatrix};$$

where, $\hat{X}_n^{k-1}$ represents a posterior state estimation of node n in the time slice of (k−1), $X_n^{k|k-1}$ represents one-step prediction of the state information, $I_2$ represents an identity matrix of 2×2, $0_2$ represents an all-zero matrix of 2×2, and $\Delta T$ represents the length of each time slice, $\Delta T_t = (t-k)\Delta T$; and performing two-step prediction to obtain initial state estimation of node $n \in g_{m,2}$ and so on.

6. The method according to claim 5, further comprising: obtaining posterior state estimation of node n in the time slice of t by:

$$\hat{X}_n^t = \hat{X}_n^{t|t-1} + K_n^t \Delta r_n^t; \text{ where,}$$

$$\hat{X}_n^{t|t-1} = F\hat{X}_n^{t-1};$$

$$\hat{P}_n^{t|t-1} = F\hat{P}_n^{t-1}F^T + Q_n^t;$$

$$\Delta r_n^t = r_n^t - h(\hat{x}_n^{t|t-1}, :);$$

$$K_n^t = \hat{P}_n^{t|t-1}(H_n^t)^T(S_n^t)^{-1};$$

$$h(\hat{x}_n^{t|t-1}, :) = \begin{bmatrix} h(\hat{x}_n^{t|t-1}, \hat{x}_{j_1}^t) \\ h(\hat{x}_n^{t|t-1}, \hat{x}_{j_2}^t) \\ \vdots \\ h(\hat{x}_n^{t|t-1}, \hat{x}_{j_{N_m}}^t) \end{bmatrix};$$

$$H_n^t = \begin{bmatrix} \frac{\partial r_n^t}{\partial x_n^t} & \frac{\partial r_n^t}{\partial y_n^t} & \frac{\partial r_n^t}{\partial \dot{x}_n^t} & \frac{\partial r_n^t}{\partial \dot{y}_n^t} \end{bmatrix};$$

$$S_n^t = H_n^t \hat{P}_n^{t|t-1}(H_n^t)^T + R_n^t;$$

$$R_n^t = \text{diag}\{(\sigma_{nj_1}^t)^2, (\sigma_{nj_2}^t)^2, \ldots, (\sigma_{nj_{N_n}}^t)^2\};$$

and; obtaining the covariance matrix by:

$$\hat{P}_n^t = \hat{P}_n^{t|t-1} - K_n^t S_n^t (K_n^t)^T;$$

where, $\hat{P}_n^{t-1}$ represents a covariance matrix of the estimation $\hat{X}_n^{t-1}$, and $Q_n^t$ represents a covariance matrix of system modeling noises.

7. The method according to claim 1, wherein obtaining state estimation of the nodes in $\xi_m$ in the current time slice comprises:
determining a maximum likelihood estimation represented by:

$$(\hat{\alpha}^k)_{MLE} = \underset{\alpha^k}{\arg\max}\, p(\bar{p}^{\mathcal{T}}, \rho^{\mathcal{T}} \mid \alpha^k).$$

8. An electronic device for obtaining location information, comprising:
a processor; and
a memory, having instructions stored thereon and executable by the processor;
wherein, when the instructions stored on the memory are executed by the processor, the processor is caused to:
obtain available measurement of a target node and multi-hop nodes in multiple consecutive time slices up to a current time slice, the measurement comprising measured location information of the target node and the multi-hop nodes and measured relative distance information among the target node and the multi-hop nodes;
predict unavailable measurement caused by multi-hop transmission delay to obtain prediction information of location information and relative distance information;
obtain location information of the target node and the multi-hop nodes in the multiple consecutive time slices based on state variables of the target node and the multi-hop nodes in the current time slice and the mobility constraints to obtain trajectory information, wherein the state variables at least comprise location, velocity and acceleration;
initially estimate state information of the target node and the multi-hop nodes in the current time slice based on available measurement to obtain initial state estimation in the current time slice; and
obtain state estimation of the target node and the multi-hop nodes in the current time slice by jointly processing the available measurement and the prediction information of the location information and the relative distance information, based on the trajectory constraints and the initial state estimation in the current time slice, the state estimation comprising the location estimation of the target node in the current time slice;
wherein the processor is further caused to:
establish a location measurement model of reference nodes represented by:

$$\tilde{x}_n^t = x_n^t + b_n^t;$$

establish a range measurement model between all nodes represented by:

$$r_{nj}^t = h(x_n^t, x_j^t) + \mu_{nj}^t = \|x_n^t - x_j^t\| + \mu_{nj}^t$$

where, n and j represents nodes in $\xi_m$ including the target node and the multi-hop nodes, $x_n^t$ represents the real location of a node $n \in \xi_m$ in a time slice of t, $\tilde{x}_n^t$ represents location measurement of a reference node obtained by the GNSS receiver, $b_n^t$ represents a measurement noise of the location information meeting a Gaussian distribution with mean value of 0 and a covariance matrix of $U_n^t$, $r_{nj}^t$ represents a measurement value of relative distance between the node n and the node j, $h(x_n^t, x_j^t) = \|x_n^t - x_j^t\|$ represents a real distance, and $\mu_{nj}^t$ represents a measurement noise of the relative distance meeting a Gaussian distribution with mean value of 0 and a variance of $(\sigma_{nj}^t)^2$;
in a case that each node n in $\xi_m$ moves along a straight line with a constant acceleration, obtain the location information of node n in a time slice of $t \in \mathcal{T}$ based on the location information of node n in the current time slice of k and mobility state of node n in the current time slice of k, where the location information of node n in the time slice of $t \in \mathcal{T}$ is represented by:

$$x_n^t = x_n^k + v_n^k \Delta T_t + \tfrac{1}{2} a_n^k (\Delta T_t)^2, n \in \xi_m, t \in \mathcal{T},$$

where, $\mathcal{T} = \{\tau, \tau+1, \ldots m\,k\}$, $\tau = k-K+1$, $\Delta T$ represents the length of each time slice, $\Delta T_t = (t-k)\Delta T$, $v_n^k$ represents the speed of node n in the current time slice of k, $a_n^k$ represents the acceleration of node n in the current time slice of k.

9. The electronic device according to claim 8, wherein the available location information of the nodes in $\xi_m$ in multiple consecutive time slices up to the current time slice k and the relative distance measurement between the nodes in $\xi_m$ in multiple consecutive time slices up to the current time slice k are determined as:

$$\begin{cases} \hat{x}_m^{0:k-1}, \tilde{x}_m^k \\ \hat{x}_n^{0:k-\ell}, \tilde{x}_n^{k-\ell+1}, n \in g_{m,\ell}, \ell \in \{1,2\} \\ r_{mn}^{0:k}, n \in g_{m,1} \\ r_{nj}^{0:k-\ell}, n \in g_{m,\ell}, j \in \xi_m, \ell \in \{1,2\} \end{cases};$$

where, $\hat{x}_n^t$ represents the location estimation of node n in the time slice of t.

10. The electronic device according to claim 8, wherein the prediction information of the unavailable location information and the relative distance information is represented by:

$$\begin{cases} \bar{x}_m^k = f_m(\hat{x}_m^{0:k-1}, \tilde{x}_m^k) \\ \bar{x}_n^{k-\ell+1:k} = f_\ell(\hat{x}_n^{0:k-\ell}, \tilde{x}_n^{k-\ell+1}), n \in g_{m,\ell}, \ell \in \{1,2\} \\ \bar{\rho}_{nj}^{k-\ell+1:k} = h_\ell(r_{nj}^{0:k-\ell}), n \in g_{m,\ell}, j \in \xi_m, \ell \in \{1,2\} \end{cases}$$

besides, let $$\begin{cases} \bar{x}_m^{0:k-1} = \hat{x}_m^{0:k-1} \\ \bar{x}_n^{0:k-\ell} = \hat{x}_n^{0:k-\ell}, n \in g_{m,\ell}, \ell \in \{1,2\} \\ \bar{\rho}_{mn}^{0:k} = r_{mn}^{0:k}, n \in g_{m,1} \\ \bar{\rho}_{nj}^{0:k-\ell} = r_{nj}^{0:k-\ell}, n \in g_{m,\ell}, j \in \xi_m, \ell \in \{1,2\} \end{cases};$$

where, $f_m$ and $f_\ell$ represent prediction functions of the location information of nodes, and $h_\ell$ represents a prediction function of the relative distance information.

11. The electronic device according to claim 8, wherein the trajectory information is represented by:

$$x_n^t = F^t z_n^k, n \in \xi_m, t \in \mathcal{T};$$

$$F^t = [I_2, \Delta T_t I_2, \tfrac{1}{2}(\Delta T_t)^2 I_2];$$

where, $z_n^k$ represents the state variable of node $n \in \xi_m$, $I_2$ represents an identity matrix of 2×2 and $\Delta T$ represents the length of each time slice, $\Delta T_t = (t-k)\Delta T$.

12. The electronic device according to claim 8, wherein the processor is further caused to:
perform one-step prediction to obtain initial state estimation of node $n \in g_{m,1}$ represented by:

$$\hat{X}_n^{k|k-1} = F \hat{X}_n^{k-1};$$

$$F = \begin{bmatrix} I_2 & \Delta T I_2 \\ 0_2 & I_2 \end{bmatrix};$$

where, $\hat{X}_n^{k-1}$ represents a posterior state estimation of node n in the time slice of (k−1), $\hat{X}_n^{k|k-1}$ represents one-step prediction of the state information, $I_2$ represents an identity matrix of 2×2, $0_2$ represents an all-zero matrix of 2×2, and $\Delta T$ represents the length of each time slice, $\Delta T_t = (t-k)\Delta T$; and performing two-step prediction to obtain initial state estimation of node $n \in g_{m,2}$ and so on.

13. The electronic device according to claim 12, wherein the processor is further caused to:
obtain a posterior state estimation of node n in the time slice of t by:

$$\hat{X}_n^t = \hat{X}_n^{t|t-1} + K_n^t \Delta r_n^t; \text{ where,}$$

$$\hat{X}_n^{t|t-1} = F \hat{X}_n^{t-1};$$

$$\hat{P}_n^{t|t-1} = F \hat{P}_n^{t-1} F^T + Q_n^t;$$

$$\Delta r_n^t = r_n^t - h(\hat{x}_n^{t|t-1}, :);$$

$$K_n^t = \hat{P}_n^{t|t-1} (H_n^t)^T (S_n^t)^{-1};$$

$$h(\hat{x}_n^{t|t-1}, :) = \begin{bmatrix} h(\hat{x}_n^{t|t-1}, \hat{x}_{j_1}^t) \\ h(\hat{x}_n^{t|t-1}, \hat{x}_{j_2}^t) \\ \vdots \\ h(\hat{x}_n^{t|t-1}, \hat{x}_{j_{N_m}}^t) \end{bmatrix};$$

$$H_n^t = \begin{bmatrix} \dfrac{\partial r_n^t}{\partial x_n^t} & \dfrac{\partial r_n^t}{\partial y_n^t} & \dfrac{\partial r_n^t}{\partial \dot{x}_n^t} & \dfrac{\partial r_n^t}{\partial \dot{y}_n^t} \end{bmatrix};$$

$$S_n^t = H_n^t \hat{P}_n^{t|t-1} (H_n^t)^T + R_n^t;$$

$$R_n^t = \text{diag}\{(\sigma_{n,j_1}^t)^2, (\sigma_{n,j_2}^t)^2, \ldots, (\sigma_{n,j_{N_n}}^t)^2\};$$

and; obtain the covariance matrix by:

$$\hat{P}_n^t = P_n^{t|t-1} - K_n^t S_n^t (K_n^t)^T;$$

where, $\hat{P}_n^{t-1}$ represents a covariance matrix of the estimation $\hat{X}_n^{t-1}$, and $Q_n^t$ represents a covariance matrix of system modeling noises.

14. The electronic device according to claim 8, wherein the processor is further caused to:
determine a maximum likelihood estimation represented by:

$$(\hat{\alpha}^k)_{MLE} = \underset{\alpha^k}{\arg\max}\, p(\bar{p}^\mathcal{T}, \rho^\mathcal{T} \mid \alpha^k).$$

15. A non-transitory computer readable storage medium, having instructions stored thereon, wherein when the instructions are executed by a processor, a method for obtaining location information is performed, the method comprising:
obtaining available measurement of a target node and multi-hop nodes in multiple consecutive time slices up to a current time slice, the measurement information comprising measured location information of the target node and the multi-hop nodes and measured relative distance information between the target node and the multi-hop nodes;

predicting unavailable measurement caused by multi-hop transmission delay to obtain prediction information of location information and relative distance information;

obtaining location information of the target node and the multi-hop nodes in the multiple consecutive time slices based on state variables of the target node and the multi-hop nodes in the current time slice and the mobility constraints to obtain trajectory information, wherein the state variables at least comprise location, velocity and acceleration;

initially estimating state information of the target node and the multi-hop nodes in the current time slice based on available measurement to obtain initial state estimation in the current time slice; and obtaining state estimation of the target node and the multi-hop nodes in the current time slice by jointly processing the available measurement and the prediction information of the location information and the relative distance information, based on the trajectory constraints and the initial state estimation in the current time slice, the state estimation comprising the location estimation of the target node;

wherein the method further comprises:

establishing a location measurement model of reference nodes represented by:

$$\tilde{x}_n^t = x_n^t + b_n^t;$$

establishing a relative distance measurement model between all nodes represented by:

$$r_{nj}^t = h(x_n^t, x_j^t) + \mu_{nj}^t = \|x_n^t - x_j^t\| + \mu_{nj}^t$$

where, n and j represents nodes in $\xi_m$ including the target node and the multi-hop nodes, $x_n^t$ represents the real location of a node $n \in \xi_m$ in a time slice of t, $\tilde{x}_n^t$ represents location measurement of a reference node obtained by the GNSS receiver, $b_n^t$ represents a measurement noise of the location information meeting a Gaussian distribution with mean value of 0 and a covariance matrix of $U_n^t$, $r_{nj}^t$ represents a measurement value of relative distance between the node n and the node j, $h(x_n^t, x_j^t) = \|x_n^t - x_j^t\|$ represents a real distance, and $\mu_{nj}^t$ represents a measurement noise of the relative distance meeting a Gaussian distribution with mean value of 0 and a variance of $(\sigma_{nj}^t)^2$; and in a case that each node in $\xi_m$ moves along a straight line with a constant acceleration, obtaining the location information of the node n in a time slice of $t \in \mathcal{T}$ based on the location information and mobility state of node n in the current time slice of k, where the location information of node n in the time slice of $t \in \mathcal{T}$ is represented by:

$$x_n^t = x_n^k + v_n^k \Delta T_t + \tfrac{1}{2} a_n^k (\Delta T_t)^2, n \in \xi_m, t \in \mathcal{T},$$

where, $\mathcal{T} = \{\tau, \tau+1, \ldots, k\}$, $\tau = k-K+1$, $\Delta T$ represents the length of each time slice, $\Delta T_t = (t-k)\Delta T$, $v_n^k$ represents the speed of node n in the current time slice of k, $a_n^k$ represents the acceleration of node n in the current time slice of k.

* * * * *